June 24, 1958 — J. L. STERISS — 2,839,755
BASEBALL CATCHER'S MASK
Filed June 18, 1956 — 2 Sheets-Sheet 1
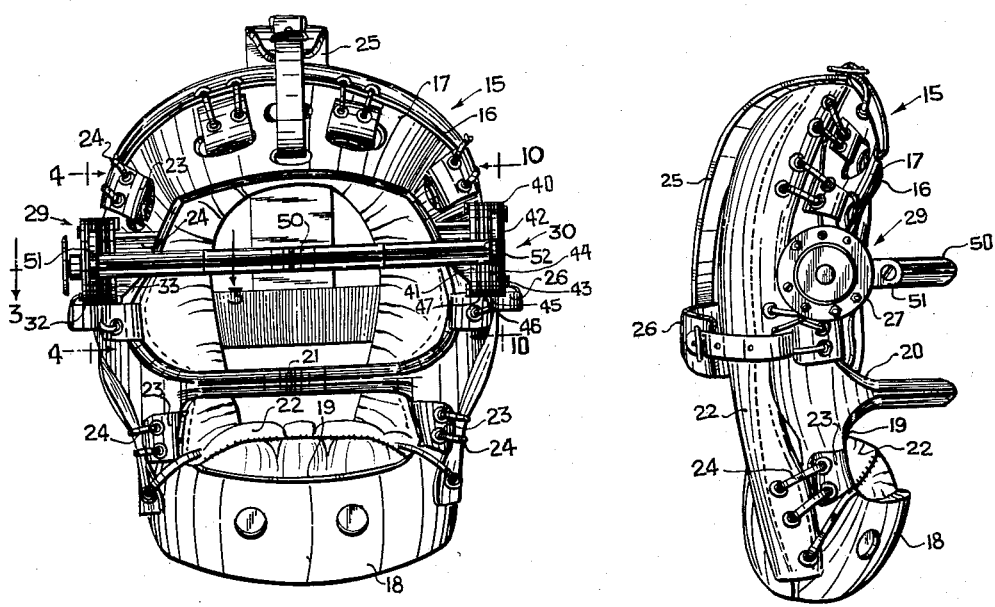
Fig. 1.
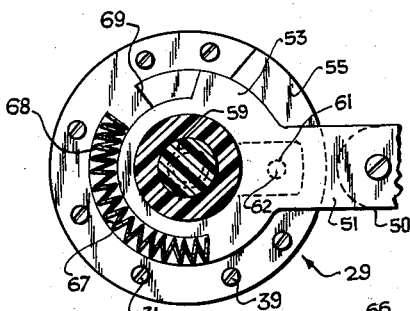
Fig. 2.
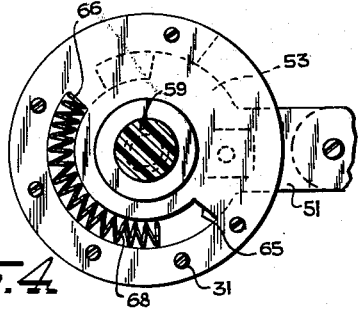
Fig. 5.
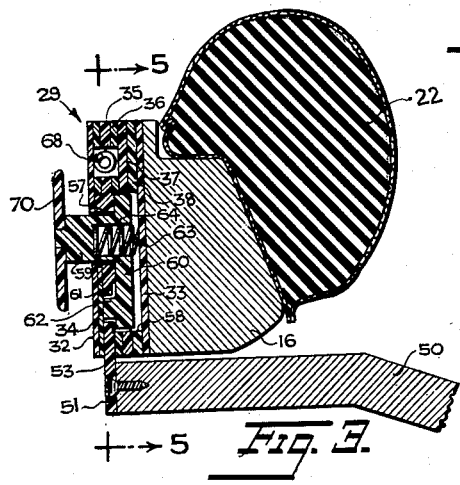
Fig. 4.
Fig. 3.
INVENTOR.
JOHN L. STERISS
BY
ATTORNEY June 24, 1958     J. L. STERISS     2,839,755
BASEBALL CATCHER'S MASK Filed June 18, 1956     2 Sheets-Sheet 2

INVENTOR
JOHN L. STERISS
BY
*Zoltan Holachek*
ATTORNEY

2,839,755

BASEBALL CATCHER'S MASK

John L. Steriss, New York, N. Y.

Application June 18, 1956, Serial No. 592,171

7 Claims. (Cl. 2—9)

This invention relates to new and useful improvements in baseball masks for catchers and umpires.

More particularly, the present invention proposes the construction of an improved baseball mask which will give the maximum protection to the wearer and still will not need to be removed at any time during play for full vision of foul or fly balls, sliding runners, other players or the like such as is now the case with present masks where a catcher or umpire must rip off the mask to see a high ball or close play, or to discuss such plays with players or managers.

As a further object, the present invention proposes forming the mask with a pivotable eye-protecting cross or upper bar which can be locked in place across the eye opening of the mask and which can be raised instantly over the eye opening by hand pressure on a wide plunger actuating disc at one side of the mask.

Still further, the present invention proposes constructing the mask and crossbar so that by pulling down on the crossbar when raised, it will automatically lock into proper position across the eye opening of the mask.

A further object of the invention is to provide a mask which will save time and effort on the part of the wearer, will assure unbroken vision of the flight of a ball, and which, when remaining on the head with the crossbar raised, frames the face and acts as a visor or shield against the sun's rays or night lights.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front view of a baseball mask constructed and arranged in accordance with the present invention.

Fig. 2 is a side view of the structure shown in Fig. 1.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 3.

Figure 6:
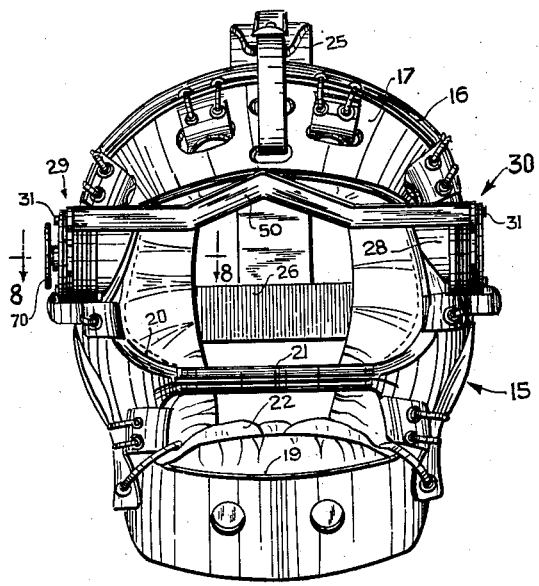
Fig. 6 is a view similar to Fig. 1 but showing the eye-protecting crossbar raised.

Referring more particularly to the drawings, the baseball mask is designated generally by the reference numeral 15.

Mask 15 has a rigid face-encircling frame 16 of steel, cast iron, heavy plastic or the like. The frame 16 has a forehead portion 17, a chin portion 18 and a mouth and eye openings 19 and 20 which are separated by a fixed lower bar portion 21.

A resilient pad 22, cloth or leather covered, lines the frame behind the frame and is removably attached to the frame by straps 23 and laces 24. Head straps 25 and 26 provide attaching members to secure the frame and pad over a person's face.

Side brackets 27 and 28, which may be made as an integral part of the frame 16, are provided at the sides of the eye opening 20 on the frame and disc housing members 29 and 30 are secured to the brackets as by rivets or bolts 31. The disc housing members 29 and 30 may be made up of a plurality of spaced plastic disc members or can be made as single units. As shown, disc housing member 29 is made up of an outer cover plate 32, rear plate 33, and intermediate plates 34, 35, 36, and 37 and 38 all held together by rivets or bolts 39. Likewise, disc housing member 30 is made up of an outer cover plate 40, rear plate 41 and intermediate plates 42, 43, 44, 45, 46 and 47 held together by rivets or bolts 48.

Figure 7:
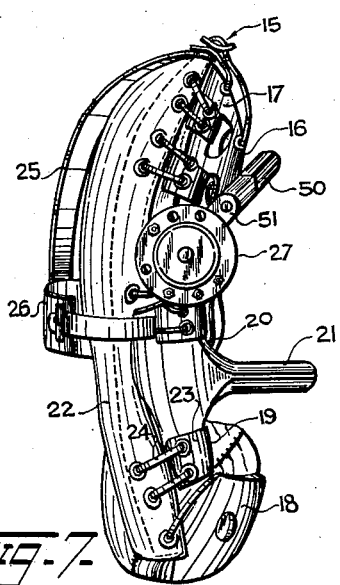
Fig. 7 is a side view of the structure as shown in Fig. 6.
Figure 9:
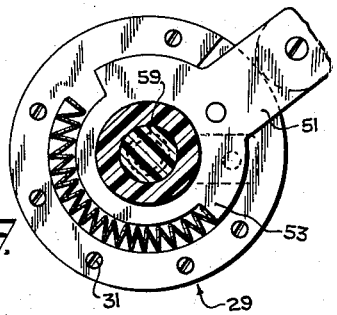
Fig. 9 is a sectional view taken on line 9—9 of Fig. 8.
Figure 8:
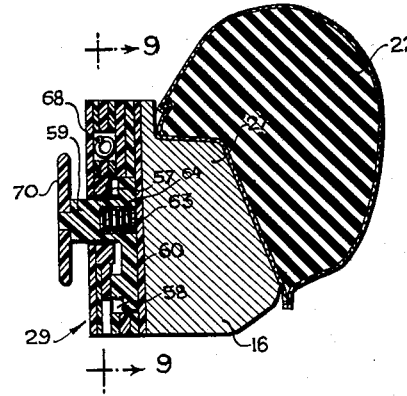
Fig. 8 is a sectional view taken on line 8—8 of Fig. 6.
Figure 10:
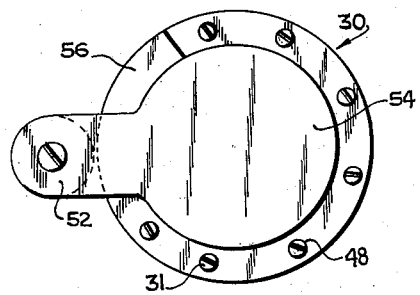
Fig. 10 is a sectional view taken on line 10—10 of Fig. 1.

An eye-protecting crossbar 50 has rearwardly extending end lever arms 51 and 52 with disc portions 53 and 54 pivotally mounted in the disc housing members 29 and 30. The arms and disc portions may be of the same material as the disc housing members. The crossbar 50 extends across the eye opening 20 of the frame and the disc housing members 29 and 30 have lever arm openings 55 and 56 for movement of the crossbar to and between the lowered position shown in Figs. 1 and 2 and the raised position above the eye opening of the frame shown in Figs. 6 and 7.

Disc housing member 29 has a centrally disposed axial plunger opening 57 and a plunger guideway 58. A plunger 59 extends slidably into the plunger opening 57 and has a crossarm 60 at its inner end slidable axially in the plunger guideway 58 inwardly of the lever arm 51.

Lever arm 51 has a lock pin opening 61 on its disc portion and the plunger crossarm 60 has a lock pin 62 outwardly disposed to seat in the lock pin opening 61 on positioning the crossbar 50 across the eye opening of the frame as shown in Fig. 1 through Fig. 5.

A coil spring 63 is provided in the disc housing member 29 seated in a recess 64 in the inner end of the plunger 59 and bearing against back plate 33 of the disc housing member 29. The spring 63 biases the plunger and plunger crossarm outwardly toward the lever arm 51.

Lever arm 51 has a radial abutment 65 and the disc housing member 29 has a fixed radial abutment 66. A spring recess 67 is also provided in the member 29 and a second coil spring 68 is mounted in the recess 67 between and bearing against the abutments 65 and 66 to pivot the lever arm 51 urging it upwardly above the eye opening of the frame.

An upper stop abutment 69 is provided in disc housing member 29 to stop the lever arm 51 at its raised position above the eye opening of the frame. A wide disc member 70 is provided on the outer end of the plunger at one side of the mask for the wearer easily to depress the plunger against the spring 63.

The operation of the mask is simple. By pulling the crossbar down, the lock pin 62 seats in the lock pin opening 61 locking the bar in place across the eye opening and compressing the second coil spring 68. On pressing the disc member 70 of the plunger, the lock pin is forced out of the lock pin opening and spring 68 pivots the crossbar upwardly and holds it over the eye opening of the frame giving complete unobstructed vision through the eye opening.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A baseball mask for catchers and umpires comprising a rigid face-encircling frame having a forehead portion, a chin portion and mouth and eye openings, a resilient face pad lining the frame behind the frame and attached thereto, attaching members to secure the frame and pad over a person's face, an eye-protecting crossbar movably mounted on the frame across the eye opening and having end portions movably connected with the frame, quick release means to lock the crossbar across the eye opening of the frame, and snap movement means to raise the crossbar from across the eye opening of the frame and hold the crossbar above said opening.

2. A baseball mask for catchers and umpires comprising a rigid face-encircling frame having a forehead portion, a chin portion and mouth and eye openings, a resilient face pad lining the frame behind the frame and attached thereto, attaching members to secure the frame and pad over a person's face, an eye-protecting crossbar movably mounted on the frame across the eye opening and having end portions movably connected with the frame, quick release means to lock the crossbar across the eye opening of the frame, and snap movement means to raise the crossbar from across the eye opening of the frame and hold the crossbar above said opening, said snap movement means being operative on release of the crossbar by the quick release means.

3. A baseball mask for catchers and umpires comprising a rigid face-encircling frame having a forehead portion, a chin portion and mouth and eye openings, a resilient face pad lining the frame behind the frame and attached thereto, attaching members to secure the frame and pad over a person's face, and an eye-protecting crossbar movably mounted on the frame across the eye opening and having end portions movably connected with the frame, said frame having side brackets with disc housing members secured thereto, said crossbar end portions having rearwardly extending lever arms pivotally mounted in the disc housing members.

4. A baseball mask for catchers and umpires comprising a rigid face-encircling frame having a forehead portion, a chin portion and mouth and eye openings, a resilient face pad lining the frame behind the frame and attached thereto, attaching members to secure the frame and pad over a person's face, an eye-protecting crossbar movably mounted on the frame across the eye opening and having end portions movably connected with the frame, quick release means to lock the crossbar across the eye opening of the frame, said frame having side brackets with disc housing members secured thereto, said crossbar end portions having rearwardly extending lever arms pivotally mounted in the disc housing members, said quick release means being a plunger extending axially slidably into one of the disc housing members and through one of the lever arms, said lever arm having a lock pin opening and said plunger having an inner end portion with a lock pin removably to seat in the lock pin opening, and a resilient member in said disc housing member behind the plunger to bias the plunger inner end portion toward the lock pin opening containing lever arm releasably to seat the lock pin in said lock pin opening on alignment of the two when the crossbar extends across the eye opening of the frame.

5. A baseball mask for catchers and umpires comprising a rigid face-encircling frame having a forehead portion, a chin portion and mouth and eye openings, a resilient face pad lining the frame behind the frame and attached thereto, attaching members to secure the frame and pad over a person's face, an eye-protecting crossbar movably mounted on the frame across the eye opening and having end portions movably connected with the frame, quick release means to lock the crossbar across the eye opening of the frame, said frame having side brackets with disc housing members secured thereto, said crossbar end portions having rearwardly extending lever arms pivotally mounted in the disc housing members, said quick release means being a plunger extending axially slidably into one of the disc housing members and through one of the lever arms, said lever arm having a lock pin opening and said plunger having an inner end portion with a lock pin removably to seat in the lock pin opening, and a resilient member in said disc housing member behind the plunger to bias the plunger inner end portion toward the lock pin opening containing lever arm releasably to seat the lock pin in said lock pin opening on alignment of the two when the crossbar extends across the eye opening of the frame, and a plunger actuator disc mounted on the plunger and disposed outwardly of the disc housing member and the frame at one side of the frame.

6. A baseball mask for catchers and umpires comprising a rigid face-encircling frame having a forehead portion, a chin portion and mouth and eye openings, a resilient face pad lining the frame behind the frame and attached thereto, attaching members to secure the frame and pad over a person's face, an eye-protecting crossbar movably mounted on the frame across the eye opening and having end portions movably connected with the frame, quick release means to lock the crossbar across the eye opening of the frame, snap movement means to raise the crossbar from across the eye opening of the frame and hold the cross bar above said opening, said snap movement means being operative on release of the crossbar by the quick release means, said frame having side brackets with disc housing members secured thereto, said crossbar end portions having rearwardly extending lever arms pivotally mounted in the disc housing members, said quick release means being a plunger extending axially slidably into one of the disc housing members and through one of the lever arms, said lever arm having a lock pin opening and said plunger having an inner end portion with a lock pin removably to seat in the lock pin opening, and a resilient member in said disc housing member behind the plunger to bias the plunger inner end portion toward the lock pin opening containing lever arm releasably to seat the lock pin in said lock pin opening on alignment of the two when the crossbar extends across the eye opening of the frame, said snap movement means being a second resilient member mounted in the plunger containing disc housing member, said lever arm pivotally mounted in said disc housing member having a radial abutment member to abut one end of said second resilient member and a fixed abutment in said disc housing member to abut the other end of the second resilient member.

7. A baseball mask for catchers and umpires comprising a rigid face-encompassing frame having a forehead portion, a chin portion and spaced mouth and eye openings, a resilient face pad lining the frame behind the frame and removably secured thereto, attaching straps to secure the frame and pad over a wearer's face, said frame having side brackets at the sides of the eye opening with disc housing members secured thereto, an eye-protecting crossbar having rearwardly extending end lever arms with disc portions pivotally mounted in the disc housing members, said disc housing members having lever arm openings for movement of the crossbar to and between positions across the eye opening of the frame and above the eye opening of the frame, one of said disc housing members having a centrally disposed axial plunger opening and a plunger guideway, a plunger extending slidably into the plunger opening of said disc housing member and having a crossarm at the inner end slidably axially in the plunger guideway inwardly of the lever arm pivotally mounted in said disc housing, said lever arm having a lock pin opening in the disc portion thereof and said plunger crossarm having a lock pin outwardly disposed to seat in the lock pin opening on positioning the crossbar across the eye opening of the frame, a coil spring in the disc housing member housing the plunger axially disposed inwardly of the plunger crossarm to bias the plunger crossarm outwardly toward the lever arm, said lever arm having a radial abutment and the disc housing member housing said lever arm having a fixed abutment radially aligned with the abutment on the lever arm and a spring recess, a second coil spring mounted in said spring recess in the disc housing member between and bearing against the abutments of the lever arm and disc housing member and urging the lever arm upwardly above the eye opening of the frame, and an upper stop abutment in one of the disc housing members to stop the lever arm at a raised position above the eye opening of the frame.

References Cited in the file of this patent
UNITED STATES PATENTS

| | | |
|---|---|---|
| 2,020,249 | Shibe | Nov. 5, 1935 |
| 2,762,048 | Modin | Sept. 11, 1956 |
| 2,780,815 | Newland | Feb. 12, 1957 |
| 2,785,405 | Snyder | Mar. 19, 1957 |